W. C. SHIPHERD.
Couplings for Whiffletrees.
No. 138,701. Patented May 6, 1873.
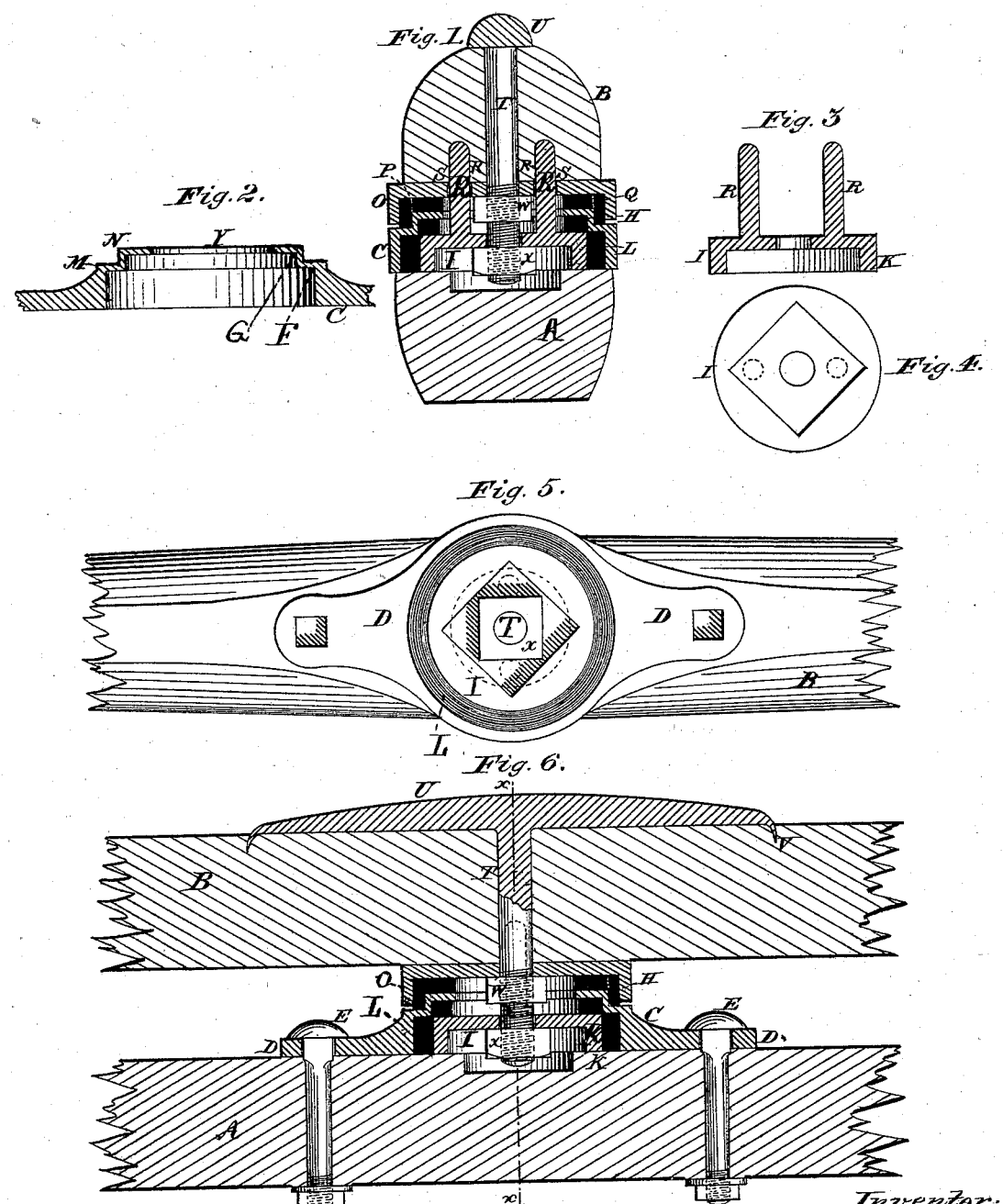
Witnesses:
Albert H. Norris
Wm. J. Peyton
Inventor:
William C. Shipherd.
By James L. Norris,
Atty.
AM. PHOTO-LITHOGRAPHIC CO. N.Y.(OSBORNES PROCESS.)

UNITED STATES PATENT OFFICE.

WILLIAM C. SHIPHERD, OF CLEVELAND, OHIO, ASSIGNOR OF THREE-FOURTHS HIS RIGHT TO S. S. COE, JOHN J. SHIPHERD, AND JAMES R. SHIPHERD, OF SAME PLACE.

IMPROVEMENT IN COUPLINGS FOR WHIFFLETREES.

Specification forming part of Letters Patent No. 138,701, dated May 6, 1873; application filed January 31, 1873.

*To all whom it may concern:*

Be it known that I, WILLIAM C. SHIPHERD, of Cleveland, in the county of Cuyahoga and State of Ohio, have invented certain new and useful Improvements in Whiffletree-Coupling, of which the following is a specification:

This invention has for its object to furnish a simple and effective device for connecting whiffletrees to eveners or double-trees of wagons, carriages, &c. The invention relates to a coupling device which comprises a recessed plate attached to the double-tree, and two flanged disks arranged on the opposite sides of said plate, connected together by means of studs or pins, and secured to a whiffletree by a bolt, as hereinafter more fully described. The invention further consists in the interposition between the recessed bearing-plate and disk of packing strips or gaskets, for taking up the wear of the operative parts and for preventing rattling.

In the drawing, Figure 1 represents a transverse sectional view of the coupling device, whiffletree, and evener. Fig. 2 represents a detail view of the recessed bearing-plate. Figs. 3 and 4 illustrate detail views of the sectional disks. Fig. 5 represents a bottom view of the coupling device with the evener removed. Fig. 6 represents a longitudinal sectional view of the coupling device applied to the whiffletree and evener.

A in the drawing may represent an evener or whiffletree, the cross-bar of vehicle shafts, or any other portion of a carriage to which whiffletrees are attached. The double-tree is of the usual construction, and has attached to its central upper side of recessed plate C, which is provided with perforated ears or lugs D, for the passage of the bolts E, which serve to secure the same in position. The upper end of the recessed plate C is provided with internal ledges or annular terraced shoulders F G, serving, respectively, as a seat for the reception of a packing gasket, H, and as the bearing-surface of a disk, I, which is connected to the whiffletree B. The disk I is formed with a rim or flange, K, on the periphery of which is fitted a washer, L, of leather, India rubber, or other suitable material. The upper end of the plate C is provided with external shoulders M N, and is inserted into a flanged disk, O, attached to the whiffletree and provided with elastic packing washers or gaskets P Q. To the lower disk I is attached one or more studs or shanks, R, which enter corresponding recesses or openings S in the upper disk O, for connecting the same together. A vertical screw-bolt, T, provided with an elongated head, U, and with spurs or points V for entering the whiffletree, extends through the disks O and I, and is provided with nuts W X, which bear against said disks for preventing their vertical displacement. The upper nut W is situated between the studs R, and is thus prevented from turning, as the studs form stops for locking the nut. The disks O I, being united by the studs formed on one of them, will be prevented from turning independently of each other, and the fastening-bolt will render the vertical movement of the parts constituting the coupling impossible. The free rotation of the disks attached to the whiffltrees on the recessed plate is permitted by forming the plate with an enlarged central aperture, G, which offers no contact-surface to the bolt and nuts.

If the bolt, from any cause, should become broken, the draft upon the whiffletree will not cause the sudden separation of the coupling devices, but the parts will be maintained in their proper relative positions for a sufficient length of time to enable repairs to be effected, and thus avoiding all accidents.

The elastic packing material inserted into seats in the coupling devices will furnish an effectual medium for counteracting the effects of wear, as the same may be readily replaced when worn with ease and facility.

All noise or rattling of the coupling devices, when in use, is also prevented by the packing applied as shown.

What I claim as new, and desire to secure by Letters Patent, is—

1. In a whiffletree coupling, the recessed plate C and disks I O, combined substantially as described, for the purpose specified.

2. In a whiffletree coupling, the disk I provided with studs R, as and for the purpose set forth.

3. The combination, with the disks I O, of the fastening-bolt T and nuts W X, as and for the purpose set forth.

4. The combination of the recessed plate C, disks I O, and packing P Q, as and for the purpose set forth.

In testimony that I claim the foregoing I have hereunto set my hand this 14th day of January, 1873.

WM. C. SHIPHERD.

Witnesses:
 CYRUS COLEMAN,
 FRED. J. WAKEMAN.